US009101201B2

(12) United States Patent
Hoche et al.

(10) Patent No.: US 9,101,201 B2
(45) Date of Patent: Aug. 11, 2015

(54) ARRANGEMENT OF POWER TOOL AND CARRYING SYSTEM

(75) Inventors: Florian Hoche, Marbach (DE); Jürgen Häberlein, Murrhardt (DE); Patrick Behringer, Ostfildern (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 391 days.

(21) Appl. No.: 13/427,933

(22) Filed: Mar. 23, 2012

(65) Prior Publication Data

US 2012/0261444 A1 Oct. 18, 2012

(30) Foreign Application Priority Data

Apr. 12, 2011 (DE) .......................... 10 2011 016 788

(51) Int. Cl.
*A45F 5/00* (2006.01)
*A45F 3/14* (2006.01)
*A01D 34/90* (2006.01)

(52) U.S. Cl.
CPC .................. *A45F 3/14* (2013.01); *A01D 34/902* (2013.01)

(58) Field of Classification Search
CPC ....................................................... A45F 3/14
USPC ......... 224/621, 255, 257, 600, 602, 607, 611, 224/614, 616, 268, 254, 269; 294/82.1–82.36
See application file for complete search history.

(56) References Cited

U.S. PATENT DOCUMENTS

| 952,367 | A | | 3/1910 | Sherkel |
| 3,038,753 | A | | 8/1960 | Seager |
| 3,722,943 | A | * | 3/1973 | Kalua, Jr. ..................... 294/82.2 |
| 3,940,173 | A | * | 2/1976 | Ulbing ........................ 294/82.21 |
| 4,293,156 | A | | 10/1981 | Chapalain |
| 5,279,021 | A | | 1/1994 | Edgin |
| 5,377,386 | A | * | 1/1995 | Griffith ............................ 24/3.1 |
| 5,620,121 | A | * | 4/1997 | Watson ......................... 224/272 |
| 2006/0108387 | A1 | * | 5/2006 | Nakaya et al. ................ 224/254 |
| 2007/0205237 | A1 | * | 9/2007 | Machens et al. ............... 224/264 |
| 2009/0090755 | A1 | * | 4/2009 | Menzel et al. ................ 224/268 |
| 2010/0270344 | A1 | * | 10/2010 | Mori et al. ..................... 224/250 |

FOREIGN PATENT DOCUMENTS

| FR | 2 432 471 | 2/1980 |
| FR | 2 534 330 | 4/1984 |
| GB | 2 132 678 A | 7/1984 |

* cited by examiner

*Primary Examiner* — Justin Larson
*Assistant Examiner* — Phillip Schmidt
(74) *Attorney, Agent, or Firm* — Gudrun E. Huckett (57) ABSTRACT

In an arrangement of a power tool and a carrying system, the carrying system has a support strap and a releasable fastening device for attaching the power tool to the support strap. The carrying system has an actuating device that actuates the releasable fastening device from a fastening position into a release position. The fastening device has a pivotable hook that in the fastening position is hooked to an eye and secures the power tool on the carrying system. When the carrying system is arranged on a user and the power tool is secured on the carrying system and the fastening device is actuated from the fastening position into the release position, the hook is pivoted such that the eye slides out of the hook because of the weight of the power tool.

16 Claims, 8 Drawing Sheets

ARRANGEMENT OF POWER TOOL AND CARRYING SYSTEM

BACKGROUND OF THE INVENTION

The invention relates to an arrangement comprising a power tool and a carrying system.

US 2009/0090755 A1 discloses an arrangement comprising a power tool and a carrying system in which the support strap is suspended with an eye in a hook provided on the power tool. The access opening into the hook is closed by a closure member that opens in both directions. In this way, a simple release of the power tool from the carrying system is possible by disengaging the eye from the hook.

The invention has the object to provide an alternative arrangement of power tool and carrying system.

SUMMARY OF THE INVENTION

In accordance with the present invention, this is achieved in that the carrying system comprises a support strap and a releasable fastening device for attachment of the power tool on the support strap. The fastening device, by means of an actuating device, is actuatable from a fastening position into a release position. The fastening device comprises a pivotable hook which is hooked in an eye in the fastening position and secures the power tool on the carrying system. When the carrying system is arranged on a user and the power tool is secured on the carrying system, an actuation of the fastening device from the fastening position into the release position causes the hook to be pivoted such that the eye slides out of the hook as a result of the weight of the power tool.

Since the eye slides out of the hook in the release position of the hook as a result of the weight of the power tool, the operator must only actuate the actuating device for releasing the power tool from the carrying system. In this way, a fast and simple release of the power tool from the carrying system is possible with one hand. The fastening device constitutes a quick-release device with which the power tool can be quickly and simply released or detached from the carrying system.

Advantageously, the hook is secured on the support strap and the eye is arranged on the power tool. In order to ensure that the eye slides out of the hook due to the weight of the power tool, it is provided that, in the release position of the fastening device, the inner contour of the hook on which the eye is resting slopes from a support location, where the eye is resting in the fastening position, to an access opening of the hook. Advantageously, the hook extends in a uniform arc so that an easy sliding movement of the eye out of the hook is achieved. It is particularly advantageously when the hook extends at least across a section thereof in a spiral shape. A spiral course is to be understood in this context as a course where the spacing from a center of the spiral continuously increases.

However, it can also be provided that the eye is secured on the support strap and the hook on the power tool. In this case, the inner contour of the hook, beginning at the support location where the hook is supported in the fastening position, extends upwardly to the access opening of the hook relative to the effective direction of gravity. In this way, it can be ensured that the eye slides out of the hook when the fastening device is in the release position. In this case, a uniformly curved, in particular spiral, course of the inner contour of the hook is also advantageous.

Advantageously, the hook is supported in a springy fashion in the direction toward the fastening position of the fastening device. In this way, a reliable fixation of the power tool on the support strap in operation of the power tool is ensured. Expediently, the fastening device has a stop that determines the rotational position of the hook in the fastening position.

A simple configuration results when at least one section of the hook is of a circular shape and the pivot axis of the hook in the fastening position is located on a side opposite the eye relative to an imaginary plane that extends horizontally and passes through the center of the circle that is formed by the circular-shaped section of the hook. The eccentric support action of the hook achieves that the weight of the power tool contributes to securing the fastening device in its fastening position. For release, the operator must apply a force that is acting also against the proportion of the weight of the power tool. In particular, the hook extends in a circular shape in the area where the eye is sliding between the fastening position and the release position.

Advantageously, the hook is supported in horizontal direction relative to the user at a support point. It is provided that the spacing of the support point to the pivot axis in the release position is greater than in the fastening position of the fastening device. For release, the operator must push the pivot axis away from the support point and work against the weight of the power tool. The increase of the spacing of the support point to the pivot axis, in case of a circular design of the hook, can be achieved, for example, by an appropriate eccentric arrangement of the pivot axis. It can also be provided that the spacing of the support point relative to the pivot axis in the release position is smaller than in the fastening position of the fastening device. In this way, less force is required for release of the fastening device. Advantageously, the hook is supported on a support plate of the carrying system.

The actuating device in the fastening position is advantageously arranged above the hook relative to the effective direction of gravity. It is provided that the hook has an access opening through which the eye can be inserted and hooked in the hook. The access opening and the actuating device are advantageously arranged adjacent to each other. When the actuating device is actuated, i.e., when the fastening device is in the release position, the hand of the user that actuates the actuating device is thus arranged in the area of the access opening. In this way, the user can catch the power tool that is released from the carrying system by the hand that has actuated the actuating device.

The fastening device has advantageously a bearing element on which the hook is rotatably supported. Advantageously, the hook and the actuating element are fixedly connected to each other and movably supported relative to the bearing element. In this way, a simple configuration results. The hook is advantageously spring-supported relative to the bearing element in the direction toward the fastening position. Advantageously, the spring is a torsion spring, in particular embodied as a coil spring, and all windings of the coil spring are arranged in the actuating element. Alternatively, it can be provided that all windings of the coil spring are arranged in the bearing element. Since the windings do not extend across the gap formed between the actuating element in the bearing element, jamming of the spring in the gap is prevented in a simple way.

Advantageously, the hook is designed and arranged such that the spacing of the hook, i.e., of the location of the hook where the eye is resting, relative to the bearing element is enlarged, or remains approximately the same, upon pivoting of the actuating device from the fastening position into the release position. Since the free space, provided between the hook and the bearing element and in which space the eye is arranged, is not decreased upon adjustment of the actuating device from the fastening position into the release position, hooking or canting of the eye between hook and bearing element can be prevented in a simple way. The space that is available for the eye between the bearing element and the hook and through which the eye passes when sliding from the hook does not become narrower upon pivoting of the actuating element.

Advantageously, the fastening device has a securing element that is connected fixedly with the bearing element and that closes at least partially the access opening into the hook in the fastening position and releases it in the release position. In this way, an accidental sliding of the eye out of the hook in operation can be reliably prevented. Advantageously, the securing element is elastic so that the eye opposite to the elastic force of the securing element can be hooked in the hook. In this way, the actuating device must not be actuated for fixation of the power tool on the carrying system. The securing element is advantageously connected to the bearing element so that the access opening of the hook pivots away from the securing element upon actuation of the actuating device. Advantageously, the movement of the securing element is limited by a stop in at least one movement direction. The movement of the securing element in this context is advantageously achieved by elastic deformation of the securing element. The stop ensures that the securing element will not deform to an impermissible extent. The fastening device has advantageously a first stop that delimits the deflection of the securing element into the interior of the hook, i.e., when hooking an eye in the hook. Advantageously, a second stop is provided that delimits the deflection of the securing element in outward direction, i.e., when pulling an eye that has been hooked in the hook against the securing element. By means of the stops an excessive bending of the securing element that could cause the securing element to become damaged can be prevented. Advantageously, the securing element has an approximately U-shaped configuration wherein the two legs of the U are expediently fixed to the bearing element. Advantageously, the two legs of the U are formed monolithically together with the bearing element.

Advantageously, between hook and securing element an insertion area is formed that becomes smaller in the direction toward the interior of the hook and advantageously is approximately funnel-shaped or wedge-shaped in cross-section. The sidewalls of the funnel or wedge can have a curved configuration. The insertion area facilitates threading of the eye into the hook and guides the eye at the access opening into the hook. In this way, a precise positioning of the eye on the hook can be achieved in a simple way. With the precise positioning it can be ensured that upon insertion of the eye into the hook only minimal operating forces are required.

BRIEF DESCRIPTION OF THE DRAWING

Embodiments of the invention will be explained in the following with the aid of the drawings in more detail.

DESCRIPTION OF THE PREFERRED EMBODIMENTS

Figure 1:
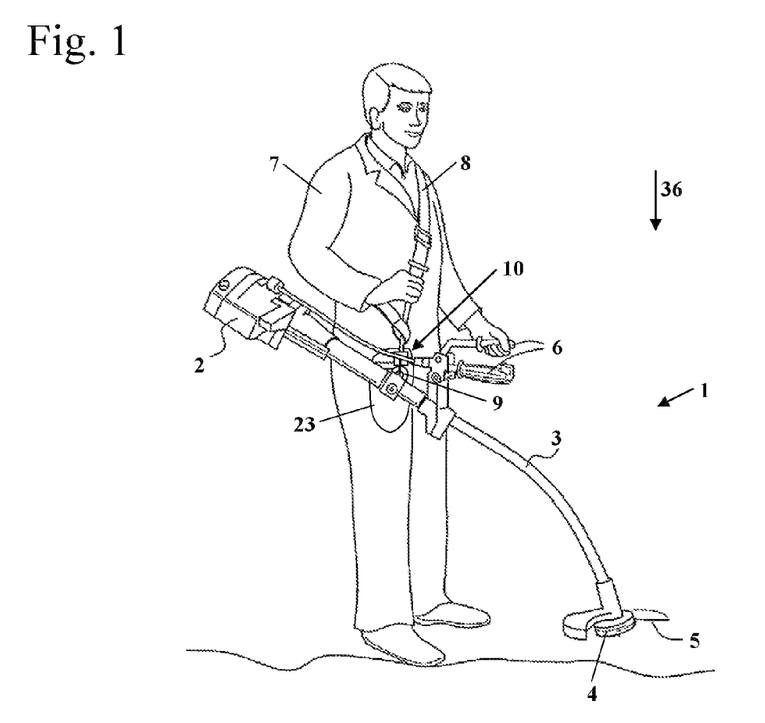
FIG. 1 is a schematic perspective illustration of a power tool carried by a user with a carrying system.

FIG. 1 shows a trimmer 1 as an embodiment of a power tool supported by a carrying system. The trimmer 1 has a housing 2 in which a drive motor, not illustrated, is arranged. The drive motor is in particular an internal combustion engine, preferably a single cylinder two-stroke engine. However, the drive motor can also be in the form of an electric motor wherein preferably a battery pack is used as an energy supply. The housing 2 is connected by means of guide tube 3 with a string-based trimmer head 4. The string-based trimmer head 4 is driven in rotation and has a mowing string 5 whose ends project radially outwardly. The drive action is realized by means of a drive shaft rotatably supported in the guide tube 3. However, it can also be provided that the drive motor is arranged at the lower end remote from the housing 2 of the guide tube 3 adjacent to the string-based trimmer head 4. On the guide tube 3 two handles 6 are provided for guiding the trimmer 1.

The trimmer 1 is arranged on a carrying system that comprises a support strap 8 and a fastening device 10 for connecting the support strap 8 with the power tool 1. The fastening device 10 engages an eye 9 of the trimmer 1. Adjacent to the fastening device 10 a support plate 23 is provided that is secured on the support strap 8 and by means of which the trimmer 1 is resting on the user 7. The support strap 8 is guided about the shoulder of the user 7, in particular the shoulder that is facing away from the trimmer 1. Instead of the support strap 8, it is also possible to employ a strap arrangement with several straps or belts.

Figure 2:
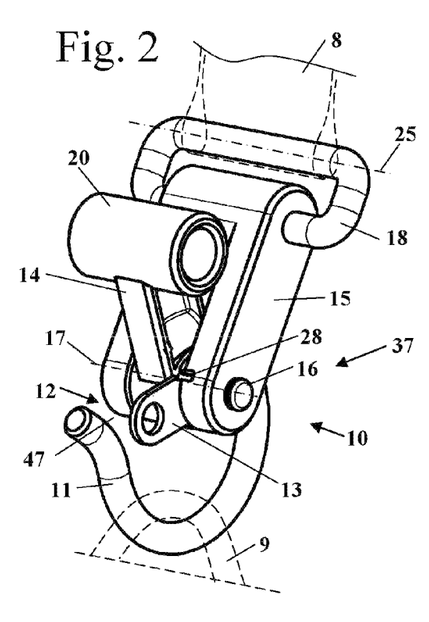
FIG. 2 shows the fastening device of the carrying system of FIG. 1 in perspective illustration in the fastening position.

FIG. 2 shows the fastening device 10 in detail wherein the support strap 8 and the eye 9 are indicated in dashed lines. In FIG. 2, the fastening device 10 is shown in the closed state, i.e., in the fastening position 37 in which the eye 9 is hooked in a hook 11 of the fastening device 10. The hook 11 has an access opening 12 that is closed substantially by the securing element 13 in the fastening position 37 of the fastening device 10 illustrated in FIG. 3. The securing element 13 is connected fixedly with the bearing element 15. The bearing element 15 is approximately U-shaped and is connected in the area of the bottom of the U by means of a fastening bracket 18 to the support strap 8. The fastening bracket 18 is fixedly secured on the bearing element 15. However, it can also be provided that the fastening bracket 18 is supported pivotably on the bearing element 15. The support strap 8 is threaded through the fastening bracket 18 so that the fastening bracket 18 is supported on the support strap 8, namely so as to be pivotable about the pivot axis 25.

The two legs of the U-shaped bearing element 15 are connected by a bolt 16 on which the hook 11 is pivotably supported about pivot axis 17. The hook 11 is fixedly connected with the actuating device comprising the actuating lever 14 which, in the position illustrated in FIG. 2 of the fastening device 10, projects away at a slant upwardly and away from the user 7. The actuating lever 14 is supported between the two legs of the U formed by the bearing element 15. At the free end of the actuating lever 14 an actuating section 20 is arranged that is embodied in the illustrated embodiment as a cylinder that extends transversely to the longitudinal direction of the actuating lever 14. In FIG. 2, a first spring end 28 of a torsion spring is illustrated that is arranged within the actuating lever 14 and that supports by a spring action the actuating lever 14 in a direction toward the fastening position 37 of the fastening device 10.

Figure 3:
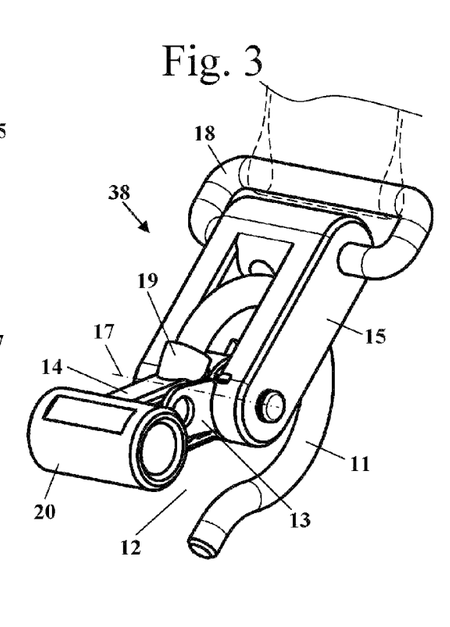
FIG. 3 shows the arrangement or FIG. 2 in the release position.

FIG. 3 shows the fastening device 10 in the release position 38 in which the eye 9 has slipped out of the hook 11. As shown in FIG. 3, the actuating lever 14 has a receptacle 19 in which one end of the hook 11 is secured. The other free end 45 of the hook 11 (FIG. 4) delimits the access opening 12. In the release position 38 illustrated in FIG. 3, the access opening 12 is pivoted away from the securing element 13 that is approximately congruent to the actuating lever 14 in this position. In this way, the access opening 12 is freely accessible.

Figure 4:
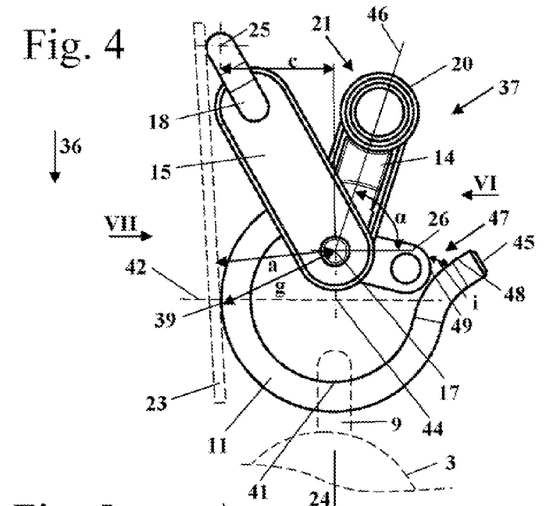
FIG. 4 is a side view of the fastening device in the position of FIG. 2.

In the illustrated embodiment, the securing element 13 is embodied to be elastic so that the eye 9 can be threaded into the hook 11 in the fastening position 37. As shown in FIGS. 2 and 4, in the area of the free end of the securing element 13 an insertion area 47 is formed between the securing element 13 and the hook 11 and tapers in the direction toward the hook interior. In the side view illustrated in FIG. 4, the insertion area 47 is approximately wedge-shaped or funnel-shaped. A sidewall 48 that delimits the insertion area is formed on the hook 11 and a further sidewall 49, oppositely positioned, is provided on the securing element 13. The sidewalls 48 and 49 have a spacing i relative to each other that decreases in the direction of the interior of the hook 11. The sidewalls 48, 49 of the funnel extend in the illustrated embodiment in a curved shape. A straight course of the sidewalls 48, 49 can be provided instead. When the eye 9 is placed into the insertion area 47, the sidewalls 48, 49 of the insertion area 47 that are formed by the hook 11 and the securing element 13 guide the eye 9 to the access opening 12 in the direction toward the hook interior. In this way, threading and inserting the eye 9 into the hook 11 is facilitated. As the eye 9 passes through the access opening 12, the securing element 13 is elastically deformed. It can also be provided that the securing element 13 is rigid with respect to the forces that occur usually during operation so that the actuating lever 14 must be actuated also for inserting the eye 9 into the hook 11 so that the access opening 12 is pivoted away from the securing element 13.

FIG. 4 shows the configuration of the fastening device 10 in the fastening position 37 in detail. The actuating lever 14 projects away from the support plate 23 and, relative to the effective direction 36 of gravity schematically indicated in FIG. 1, is positioned at an upward slant. The pivot axis 17 of actuating lever 14 and hook 11 in horizontal direction is spaced at a spacing c relative to the pivot axis 25 of the fastening bracket 18. Relative to the support plate 23 the pivot axis 17 is spaced at a spacing a that is measured perpendicularly to the plane of the support plate 23. The hook 11 and the fastening bracket 18 are resting on the support plate 23. The hook 11 is supported at a support point 39 of the support plate 23. The support point 39 must not be point-shaped but can also be of a linear shape or can be embodied as a surface. The hook 11 is of a circular configuration with the exception of the area that adjoins its free end 45. The circle that is defined by the hook 11 has a center point 44 through which an imaginary horizontal plane 42 extends. The pivot axis 17 is positioned above this imaginary plane 42; a spacing of the imaginary plane 42 to the pivot axis 17 is advantageously one fifth to approximately one third of the diameter of the circle defined by the hook 11. The power tool 1 is hooked on the hook 11 with the eye 9. The eye 9 is resting on a support location 41 at the inner contour of the hook 11. The weight 24 of the trimmer 1 acts, as indicated in FIG. 4, in the effective direction 36 of gravity. Because of the eccentric support of the hook 11, the weight 24 of the trimmer 1 counteracts additionally a displacement into the release position 38. When opening the hook 11, the spacing between pivot axis 17 and eye 9 decreases so that the trimmer 1 is lifted. In this way, an accidental opening of the fastening device 10 is prevented.

Figure 5:
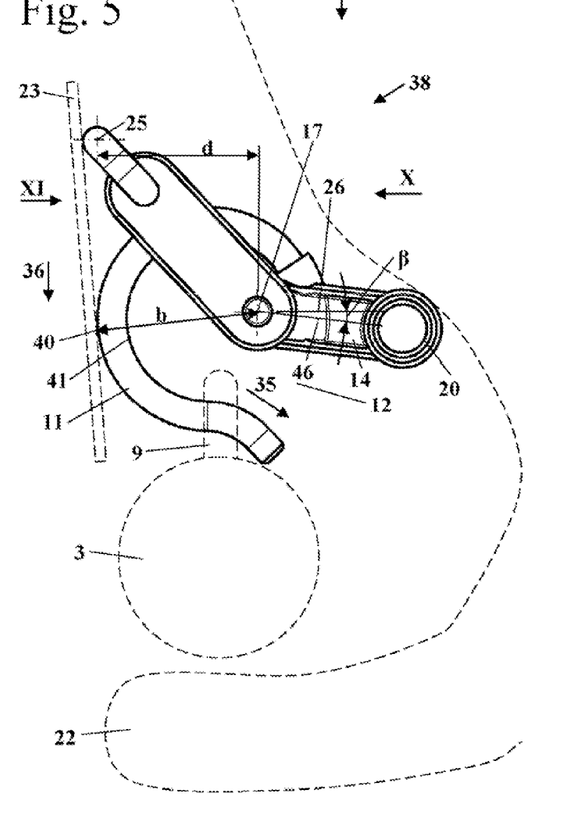
FIG. 5 is a side view of the fastening device in the position of FIG. 3.

As shown in FIG. 5, the pivot axis 17 is arranged in the release position 38 father upwardly and at a greater spacing b relative to the support plate 23. The pivot axis 17 has in horizontal direction a spacing d relative to the pivot axis 25 that is greater than the spacing c in the fastening position 37. As also shown in FIG. 5, the hook 11 is supported at a support point 40 on the support plate 23. Beginning at the support location 41 of the eye 9 in the fastening position, the inner contour of the hook 11 slopes continuously in the release position 38. Accordingly, the eye 9 slides in the release position 38 out of the hook 11 as indicated by the arrow 35 and passes through the access opening 12 that has been released by the securing element 13 out of the hook 11.

The actuating lever 14 has a central axis 46. In the fastening position 37 (FIG. 4) the central axis 46 is positioned relative to the horizontal 26 at an angle α that in the illustrated embodiment is less than 90 degrees. For actuating the fastening device 10 from the fastening location 37 into the release position 38, the actuating lever 14 must be pivoted in the actuating direction 21 at a slant downwardly and outwardly. In the release position 38, the center axis 46 of the actuating lever 14 is below the horizontal 46 and is positioned relative thereto at an angle β. The entire pivot angle, i.e., the sum of the angles α and β, is advantageously approximately 60 degrees up to approximately 120 degrees, in particular approximately 80 degrees up to approximately 100 degrees.

As schematically shown in FIG. 5, the operator can actuate the actuating lever 14 with one hand 22. In this connection, the heel of the hand of the operator is advantageously resting in the area of the actuating section 20. The fingers of the operator therefore are positioned below the access opening 12 so that the operator can catch the guide tube 3 when the eye 9 slides out of the hook 11. As illustrated in particular in FIG. 5, the access opening 12 is arranged immediately adjacent to the actuating lever 14. In this way, it is ensured that the hand 22 of the user 7 in the release position 38, i.e., when the user pushes the actuating lever 14 in downward direction, is arranged immediately adjacent to the access opening 12 so that the trimmer 1 can be caught by the user 7.

Figure 6:
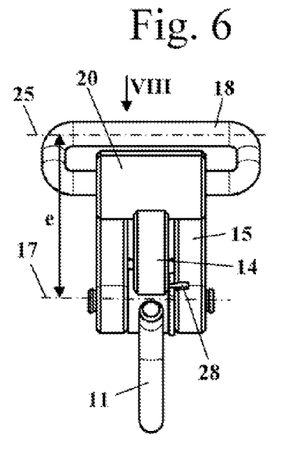
FIG. 6 is a side view in the direction of arrow VI of FIG. 4.

As shown in FIG. 6, the pivot axes 17 and 25 in the fastening position 37 have a spacing e relative to each other. The two legs of the U that is formed by the bearing element 15 surround the actuating lever 14.

Figure 7:
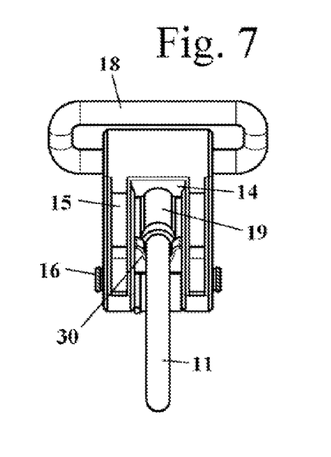
FIG. 7 is a side view in the direction of arrow VII of FIG. 4.

As shown in FIG. 7, the receptacle 19 for the hook 11 in the fastening position 37 is resting against a stop 30 which is formed monolithically with the bearing element 15 and which extends between the two legs of the bearing element 15. The spring that forces the fastening device 10 in the direction toward the fastening position 37 forces the receptacle 19 against the stop 30.

Figure 8:
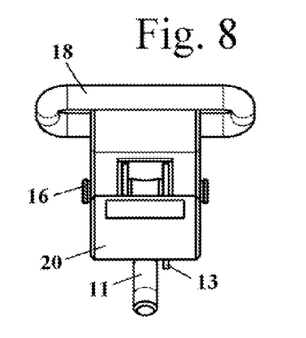
FIG. 8 is a side view in the direction of arrow VIII of FIG. 6.

FIG. 8 shows the arrangement of the hook 11 and of the securing element 13. The two elements are laterally displaced relative to each other.

Figures 9, 10, 11, 12:
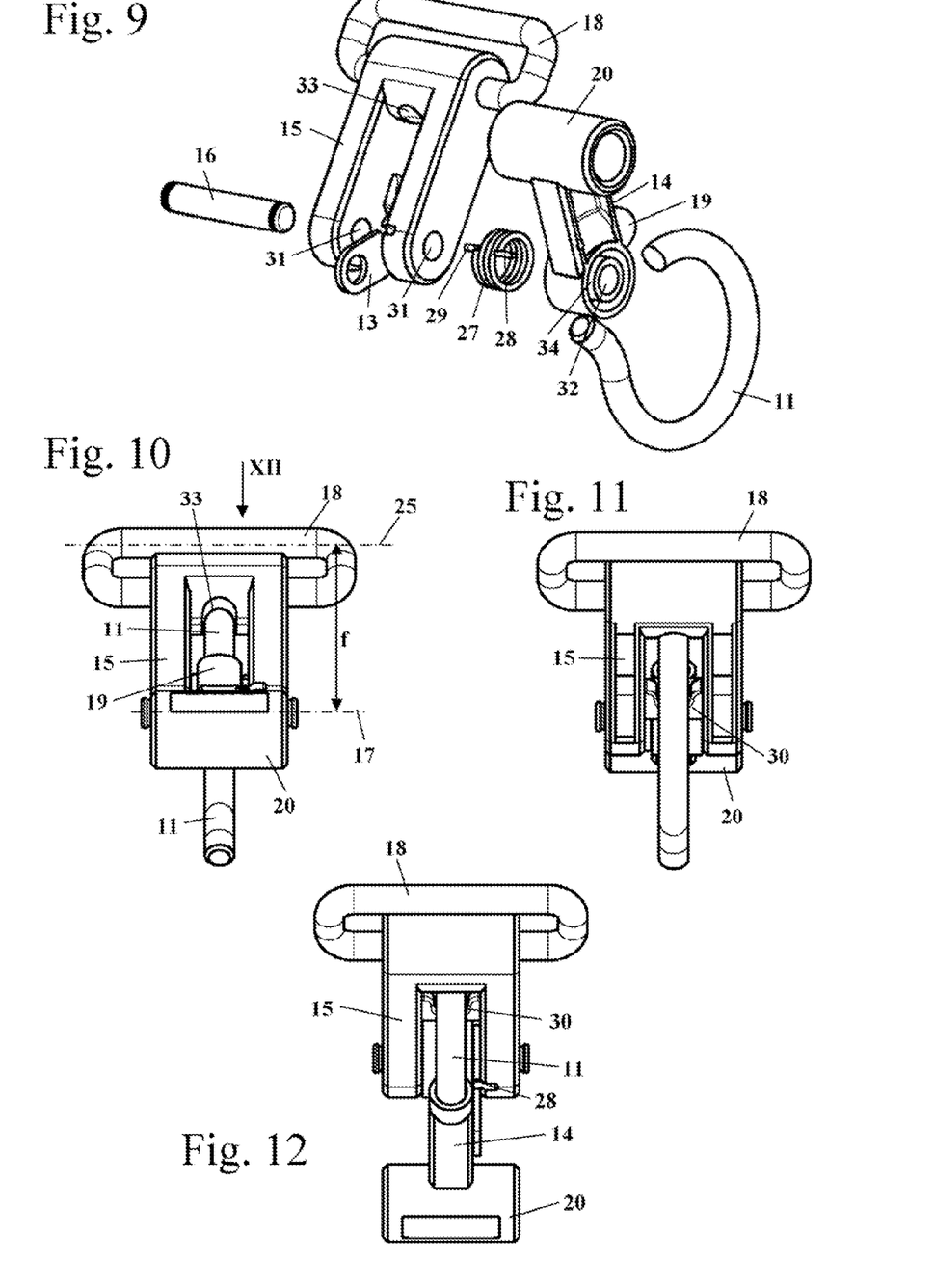
FIG. 9 is an exploded view of the fastening device.
FIG. 10 is a side view in the direction of arrow X of FIG. 5.
FIG. 11 is a side view in the direction of arrow XI of FIG. 5.
FIG. 12 is a side view in the direction of arrow XII of FIG. 10.
Figure 13:
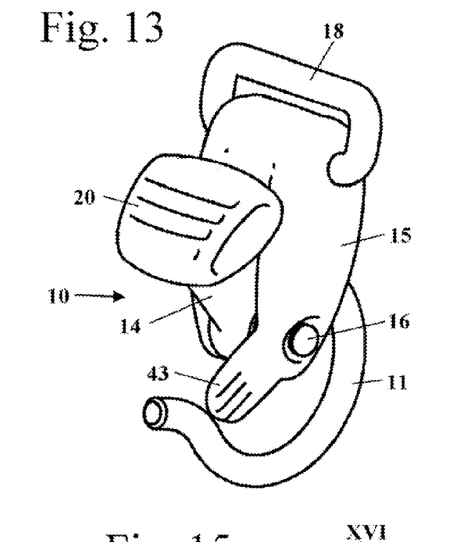
FIG. 13 is a perspective illustration of one embodiment of the fastening device.
Figure 14:
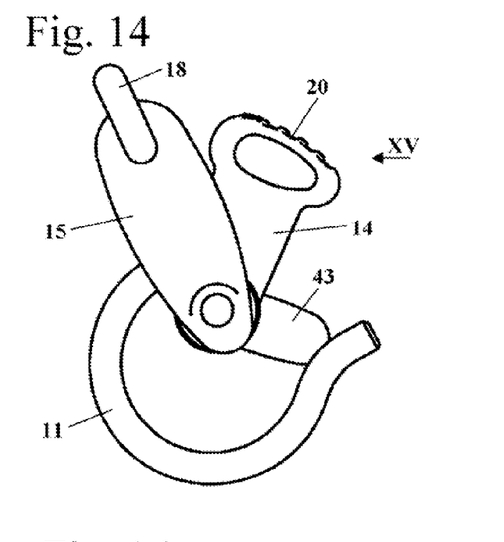
FIG. 14 is a side view of the fastening device of FIG. 13.
Figures 15, 16, 17:
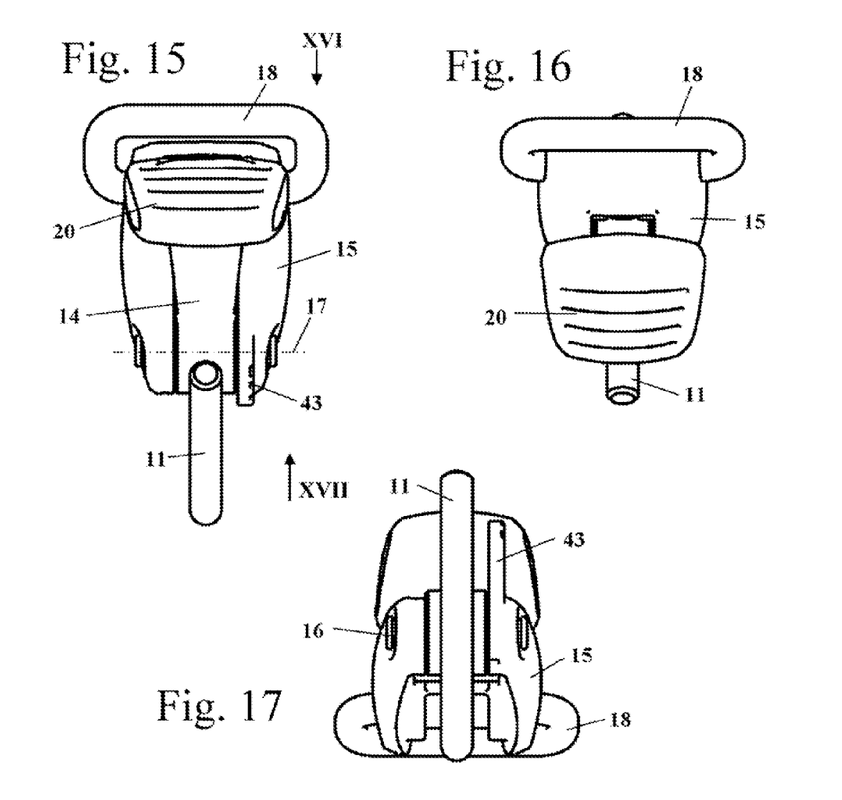
FIG. 15 is a side view in the direction of arrow XV of FIG. 14.
FIG. 16 is a side view in the direction of arrow XVI of FIG. 15.
FIG. 17 is a side view in the direction of arrow XVII of FIG. 15.

As shown in the exploded illustration of FIG. 9, a spring 27 provides a spring action for the actuating lever 14 and the hook 11. The spring 27 is a torsion spring and in particular embodied as a coil spring and has a first spring end 28 supported on the bearing element 15 as well as a second spring end 29 that is fixedly secured on the actuating lever 14. The actuating lever 14 has an opening 32 for the bolt 16. The opening 32 is surrounded by a circular receptacle 34 in which the spring 27 is arranged. As also shown in FIG. 9, the two legs of the bearing element 15 have openings 31 for the bolt 16.

FIGS. 10 to 12 show the fastening device 10 in the release position 38, also shown in FIG. 5. In this position, the two pivot axes 17 and 25, in vertical direction, have a spacing f to each other that is smaller than a spacing e in the fastening position 37 (FIG. 6). The receptacle 19 has moved away from the stop 30 that is illustrated in FIG. 11. In the area of the bottom of the U that is formed by the bearing element 15 the hook 11 is guided in a guide 33 on the bearing element 15. FIG. 12 shows also the support of the first spring end 28 on the bearing element 15.

FIGS. 13 to 17 show another embodiment of the fastening device 10 that corresponds substantially to the configuration shown in FIGS. 10 to 12. In all Figures, same reference characters identify elements that are the same or functionally the same. In the embodiment illustrated in FIG. 17, the securing element 43 is not a separate element but is a monolithic part together with the bearing element 15. In this way, a simplified configuration with a reduced number of individual parts results. The securing element 43 is advantageously designed to be elastic, for example, by being made of a sufficiently flexible plastic material.

Figure 18:
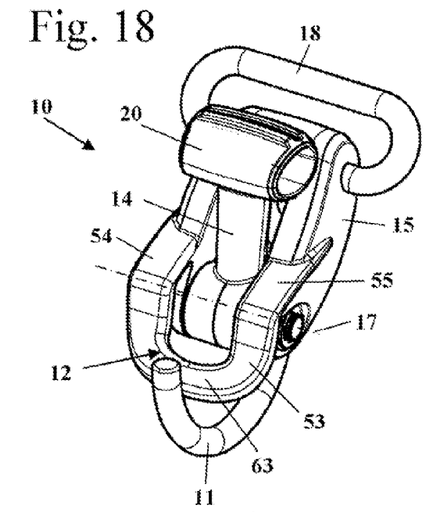
FIG. 18 shows a perspective illustration of one embodiment of the fastening device in the fastening position.
Figure 19:
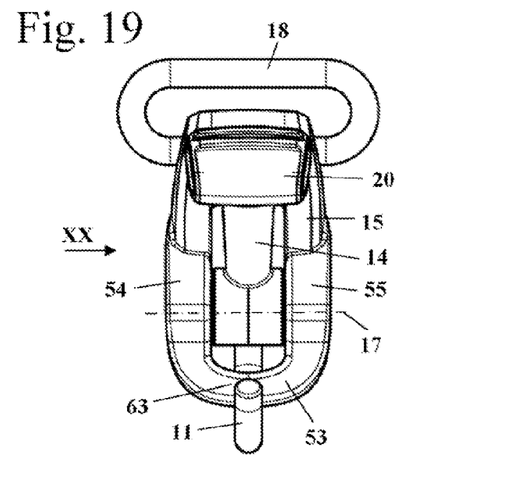
FIG. 19 is a side view of the fastening device of FIG. 18.

A further embodiment of the fastening device 10 is shown in FIGS. 18 to 37. Same reference characters identify elements that are the same or functionally the same. The fastening device 10 illustrated in FIG. 18 has a securing element 53 which is integrally formed on the bearing element 15. The securing element 53 is connected approximately in a central area of the bearing element 15 between the fastening area of the fastening bracket 18 and the pivot axis 17. The securing element 53 is approximately U-shaped and has two legs 54 and 55. The two legs 54, 55 of the securing element 53 are secured to one of the legs of the bearing element 15, respectively. The two legs 54 and 55 of the securing element 53 are angled, as shown in particular in FIGS. 20 and 21. The legs 54 and 55 have a first section 56 that is inclined relative to the connecting line 62 of the fastening bracket 18 and the pivot axis 17. The legs 54 and 55 have moreover a second section 57 that is inclined relative to the connecting line 62 in opposite direction. In the area in which the two sections 56 and 57 are joined to each other, the first section 56 is inclined by angle γ relative to the connecting line 62; this angle γ relative to the effective direction 36 of gravity opens in downward direction. The second section 57 is inclined in this area at an angle δ relative to the connecting line 62; this angle δ in the shown embodiment is greater than the angle γ and opens in upward direction opposite to the effective direction 36 of gravity in the usual orientation of the arrangement. The connecting line 62 is shown in a side view in a viewing direction parallel to the pivot axis 17. The second section 57 is arranged in the area of the access opening 12. The second section 57 closes off the access opening 12 in such a way that the eye 9, when the hook 11 is closed, cannot slide unhindered out of the hook 11. As shown in FIGS. 18 and 19, the two legs 54 and 55 are connected by a connecting area 63 that forms the bottom of the U. The connecting area 63 closes off the access opening 12 that is formed between the hook 11 and the actuating lever 14 at least partially so that the eye 9 is prevented from sliding out of the hook 11.

Figure 22:
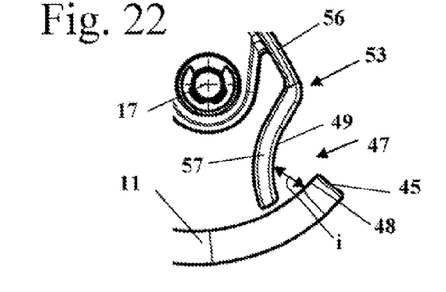
FIG. 22 is a detail view of the side view of FIG. 20.

In the detail illustration of FIG. 22, an insertion area 47 is formed between the second section 57 and the free end 45 of the hook 11 and tapers approximately in a funnel shape. The funnel-shaped course results because of the angled position of the second section 57 of the securing element 53 relative to the first section 56. The insertion area 47 is formed by a sidewall 48 formed on the hook 11 and a sidewall 49 that is formed on the securing element 53; the sidewalls 48, 49 have a spacing i relative to each other. The spacing i decreases toward the interior of the hook 11. The insertion area 47 serves as a threading guide 4 for the eye 9. The securing element 53 and the hook 11 are shaped such that the operator can place the eye 9 into the insertion area 47 on the securing element 53 or the hook 11 and the eye 9, in turn, is then guided as a result of the geometry of the insertion area 47 in the direction toward the hook interior. In this way, hooking the eye 9 in the hook 11 is facilitated and as a result of the defined position of the eye 9 when being hooked minimal operating forces for hooking the eye 9 are ensured.

Figure 20:
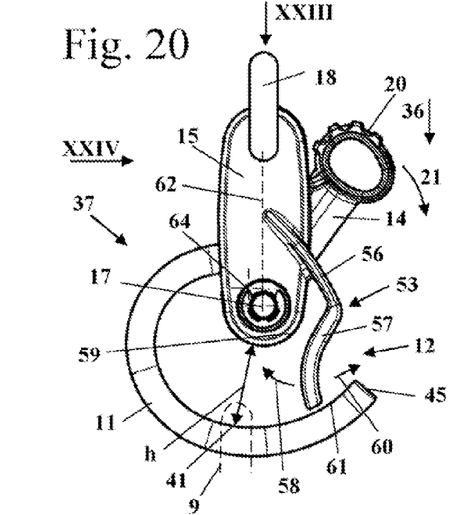
FIG. 20 is a side view in the direction of arrow XX of FIG. 19.
Figure 21:
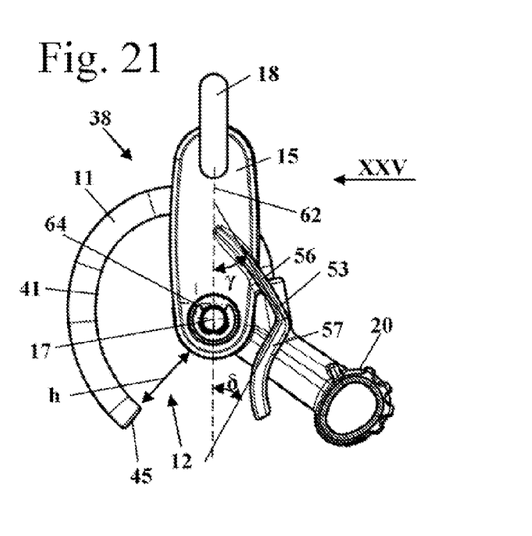
FIG. 21 is a side view in the direction of arrow XXI in FIG. 19 in the release position.

FIG. 20 shows the fastening device 10 in the fastening position 37. In this position, the access opening 12 is substantially closed by the securing element 53. The eye 9 which is indicated schematically in FIG. 20 is positioned in the area of the support location 41. The hook 11 has at the support location 41 a spacing h to the bearing element 15. When the actuating lever 14 is pivoted by pushing down the actuating section 20 in the actuating direction 21, the hook 11 pivots upwardly and the eye 9 slides off the hook 11. FIG. 21 shows the fastening device 10 in release position 38. As indicated in FIGS. 20 and 21, during pivoting of the hook 11 out of the fastening position 37 into the release position 38, the spacing h between the hook 11 and the bearing element 15 remains approximately the same or increases slightly in the area where the eye 9 is resting. This is achieved in that the hook 11 has a circular shape in the area between the support location 41 and the free end 45 and the center point 64 of the circle is neighboring the pivot axis 17. Because of the illustrated minimal displacement of the center point 64 relative to the pivot axis 17, it is achieved that the spacing h is slightly increased upon pivoting of the hook 11 out of the fastening position 37 into the release position 38.

Figure 23:
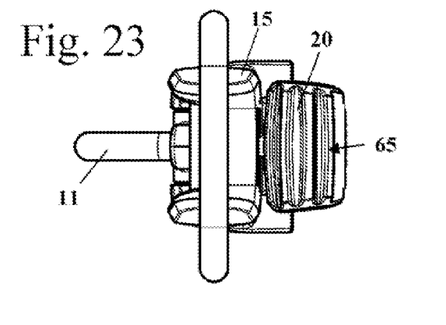
FIG. 23 is a side view in the direction of arrow XXIII of FIG. 20.

FIG. 23 show that the actuating section 20 has a profile 65 that facilitates actuation of the actuating section 20. The profile 65 increases friction on the actuating section 20.

Figure 24:
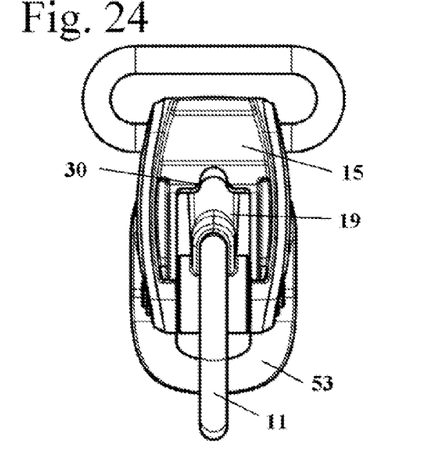
FIG. 24 is a side view in the direction of arrow XXIV of FIG. 20.
Figure 25:
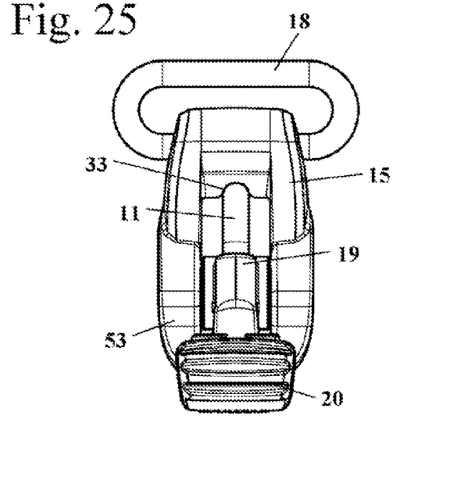
FIG. 25 is a side view in the direction of arrow XXV in FIG. 21.

As shown in FIGS. 24 and 25, on the bearing element 15 a stop 30 for the receptacle 19 of the hook 11 is formed. As shown in FIGS. 24 and 25, the bearing element 15 adjacent to the stop 30 forms a guide 33 for the hook 11.

Figures 26, 27, 28:
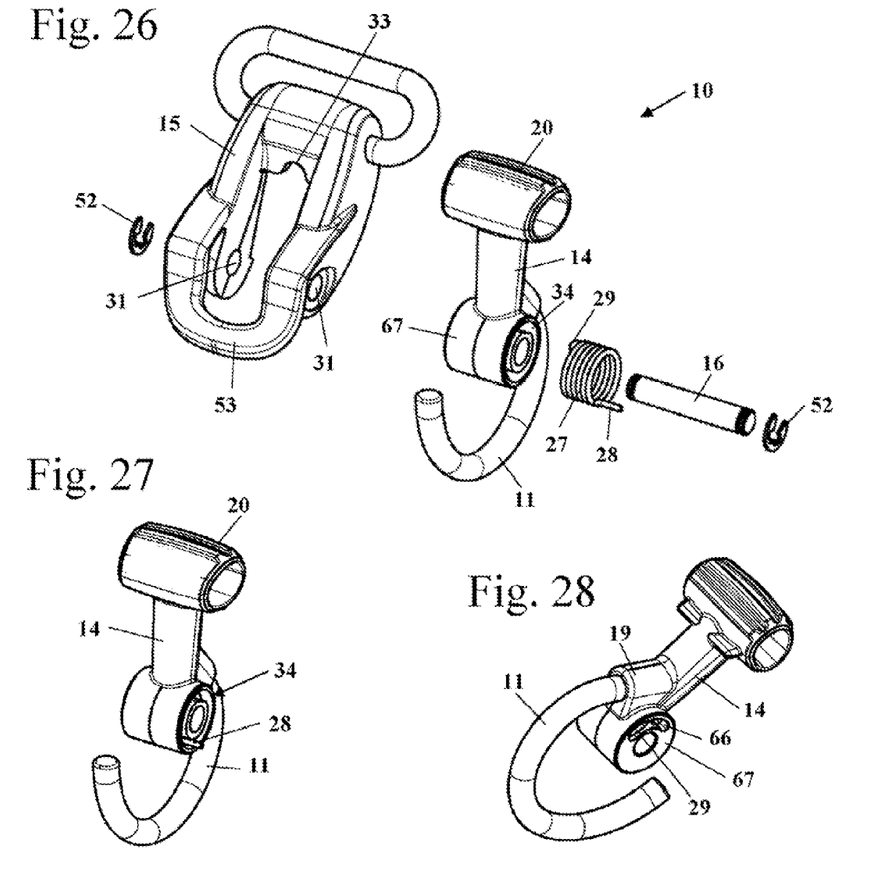
FIG. 26 is an exploded view of the fastening device.
FIG. 27 is a perspective illustration of actuating device, hook and spring of the fastening device.
FIG. 28 is another perspective illustration of actuating device, hook and spring of the fastening device.

FIG. 26 shows the configuration of the fastening device 10 in detail. The actuating lever 14 is fixedly connected to the hook 11. The actuating lever 14 has a receptacle 34 for the spring 27 that is embodied as a coil spring, i.e., embodied as a torsion spring. For securing the position of the bolt 16 in the openings 31 in the bearing element 15, securing rings 52 are provided at both ends of the bolt 16.

Figure 29:
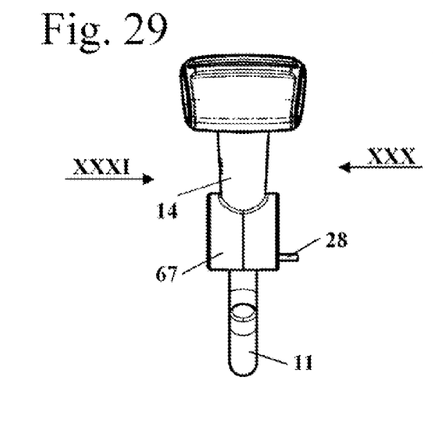
FIG. 29 is a side view of actuating device, hook and spring of the fastening device.
Figure 30:
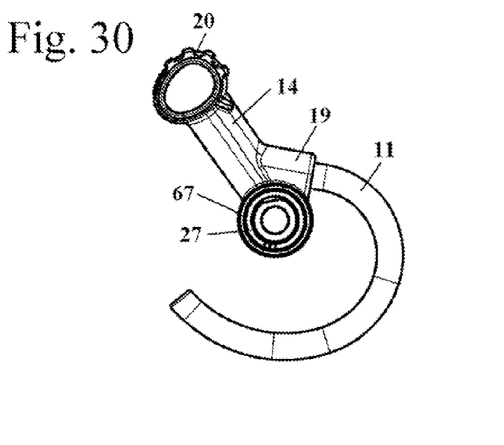
FIG. 30 is a side view in the direction of arrow XXX of FIG. 29.
Figure 31:
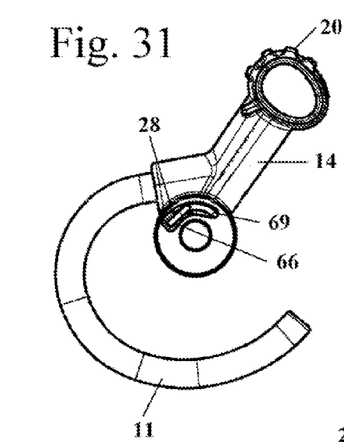
FIG. 31 is a side view in the direction of arrow XXXI of FIG. 29.
Figure 32:
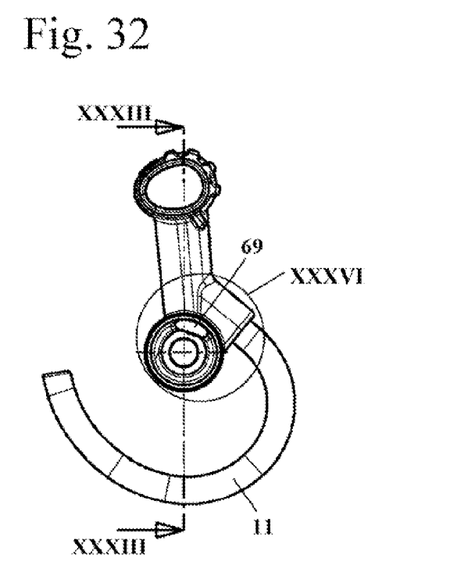
FIG. 32 a side view of the actuating device and hook.
Figures 34, 35, 36, 37:
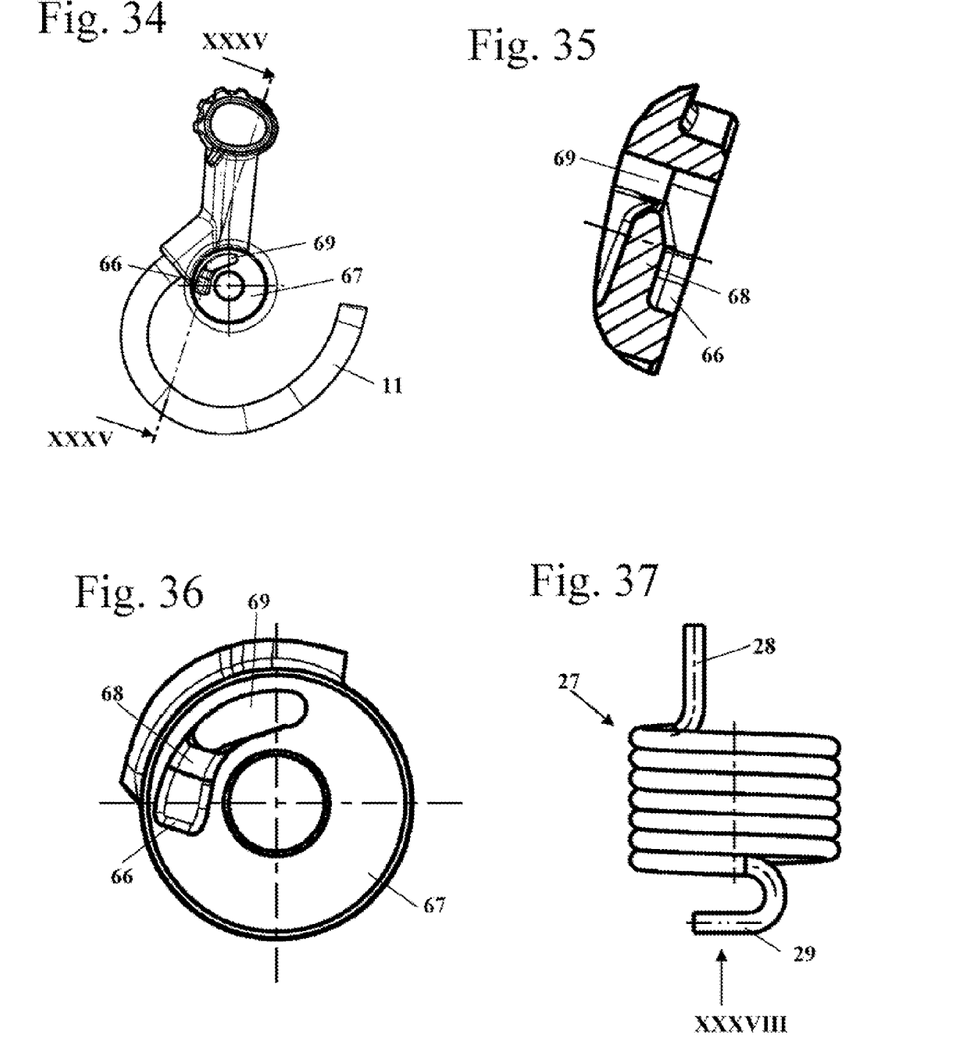
FIG. 34 is a side view of the actuating device and hook.
FIG. 35 is a detail section illustration along the section line XXXV-XXXV of FIG. 34.
FIG. 36 is a detail side view in the area of the detail XXXVI of FIG. 32.
FIG. 37 is a side view of the spring.
Figure 38:
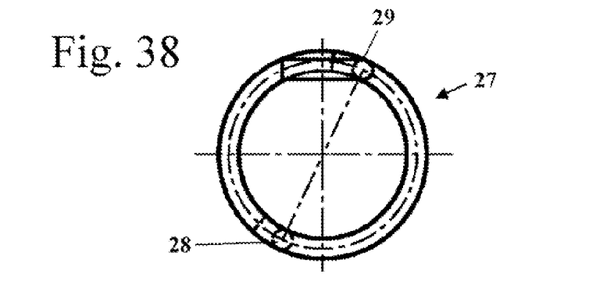
FIG. 38 is a side view in the direction of arrow XXXVIII of FIG. 37.

FIGS. 27 to 31 show the arrangement of the spring 27 in the receptacle 34. Only the straight spring end 28 that is connected to the bearing element 15 projects from the receptacle 34. The second spring end 29 is arranged in a recess 66 on the actuating lever 14, namely on a bearing section 67 of the actuating lever 14. As shown in FIG. 29, the second spring end 29 does not project past the bearing section 67. The configuration of the second spring end 29 is illustrated in FIG. 37. The second spring end 29 is approximately bent to a U-shape. For mounting the spring 27 on the bearing section 67, in the area of the recess 66 a mounting opening 69 is provided that enables passing through the second spring end 29 from the side on which in the completely mounted state the first spring end 28 is arranged.

The mounting opening 69 is illustrated in FIGS. 31 to 36. As shown in particular in FIGS. 35 and 36, adjacent to the mounting opening 69 a securing web 68 is arranged on which the second spring end 29 is hooked. In the completely mounted state, the second spring end 29 is arranged within the recess 66 and does not project past the end face of the bearing section 67. As shown in FIG. 26, this spring 27 is moreover wound in such a way that it will contract upon pivoting of the actuating lever 14 in actuating direction 21 (FIG. 20). Because of the arrangement of the spring 27 completely within the bearing section 67, it can be prevented that the spring 27 upon actuation can pass into and jam within the gap that is formed between the bearing section 67 and the bearing element 15.

Figure 33:
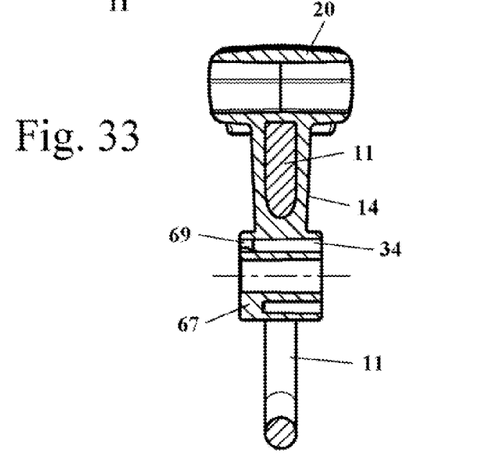
FIG. 33 is a section view along the section line XXXIII-XXXIII of FIG. 32.

As shown in FIG. 33, the hook 11 extends into the actuating lever 14 and reinforces it. In this way, an increased stability of the actuating lever 14 is achieved. However, it can also be provided that the hook 11 ends in the area of the receptacle 19.

The specification incorporates by reference the entire disclosure of German priority document 102011016788.9 having a filing date of Apr. 12, 2011.

While specific embodiments of the invention have been shown and described in detail to illustrate the inventive principles, it will be understood that the invention may be embodied otherwise without departing from such principles.

What is claimed is:

1. An arrangement comprising:
   a power tool and a carrying system;
   wherein said carrying system comprises a support strap and a releasable fastening device for attaching said power tool to said support strap;
   wherein said carrying system comprises an actuating device that actuates said releasable fastening device from a fastening position into a release position;
   wherein said fastening device comprises an actuating section that is to be actuated by a user;
   wherein said fastening device has a pivotable hook that is supported pivotably about a pivot axis and in said fastening position is hooked to an eye and secures said power tool on said carrying system;
   wherein, in said fastening position, said eye is resting on a support location at an inner contour of said hook;
   wherein, in a position of the arrangement, in which said fastening device is in said fastening position and the weight of the power tool is acting in vertical direction on the arrangement, said support location on said hook and said actuating section are positioned opposite each other relative to a horizontal plane in which said pivot axis is arranged;
   wherein, when said carrying system is arranged on the user and said power tool is secured on said carrying system and said fastening device is actuated from said fastening position into said release position, said hook is pivoted such that said eye slides out of said hook because of the weight of said power tool.

2. The arrangement according to claim 1, wherein said hook is secured on said carrying strap and said eye is secured on said power tool.

3. The arrangement according to claim 2, wherein said inner contour, in said release position of said fastening device, slopes from said support location to an access opening of said hook.

4. The arrangement according to claim 1, wherein said hook is spring-supported in a direction toward said fastening position of said fastening device.

5. The arrangement according to claim 4, wherein said fastening device has a stop that determines a rotational position of said hook in said fastening position.

6. The arrangement according to claim 1, wherein said hook is supported in a horizontal direction relative to the user at a support point, wherein a spacing of said support point to a pivot axis of said hook in said release position is greater than a spacing of said support point to a pivot axis of said hook in said fastening position.

7. The arrangement according to claim 6, wherein said carrying system comprises a support plate on which said hook is supported.

8. The arrangement according to claim 1, wherein said actuating device in said fastening position of said fastening device is positioned above said hook relative to an effective direction of gravity.

9. The arrangement according to claim 1, wherein said hook has an access opening through which said eye is inserted into said hook.

10. The arrangement according to claim 9, wherein said access opening and said actuating device are positioned adjacent to each other.

11. The arrangement according to claim 1, wherein said fastening device has a bearing element and said hook is rotationally supported on said bearing element.

12. The arrangement according to claim 11, wherein said hook and said actuating element are fixedly connected to each other and are movably supported relative to said bearing element.

13. The arrangement according to claim 11, wherein said fastening device has a securing element that is fixedly connected to said bearing element, wherein said hook has an access opening through which said eye is inserted into an interior of said hook, and wherein said securing element at least partially closes said access opening in said fastening position and releases said access opening in said release position.

14. The arrangement according to claim 13, wherein said securing element is elastic.

15. The arrangement according to claim 14, wherein a movement of said securing element is limited by a stop in at least one movement direction.

16. The arrangement according to claim 13, wherein between said hook and said securing element an insertion area is formed and said insertion area has a width that decreases in a direction toward said interior of said hook.

\* \* \* \* \*